Patented June 3, 1952

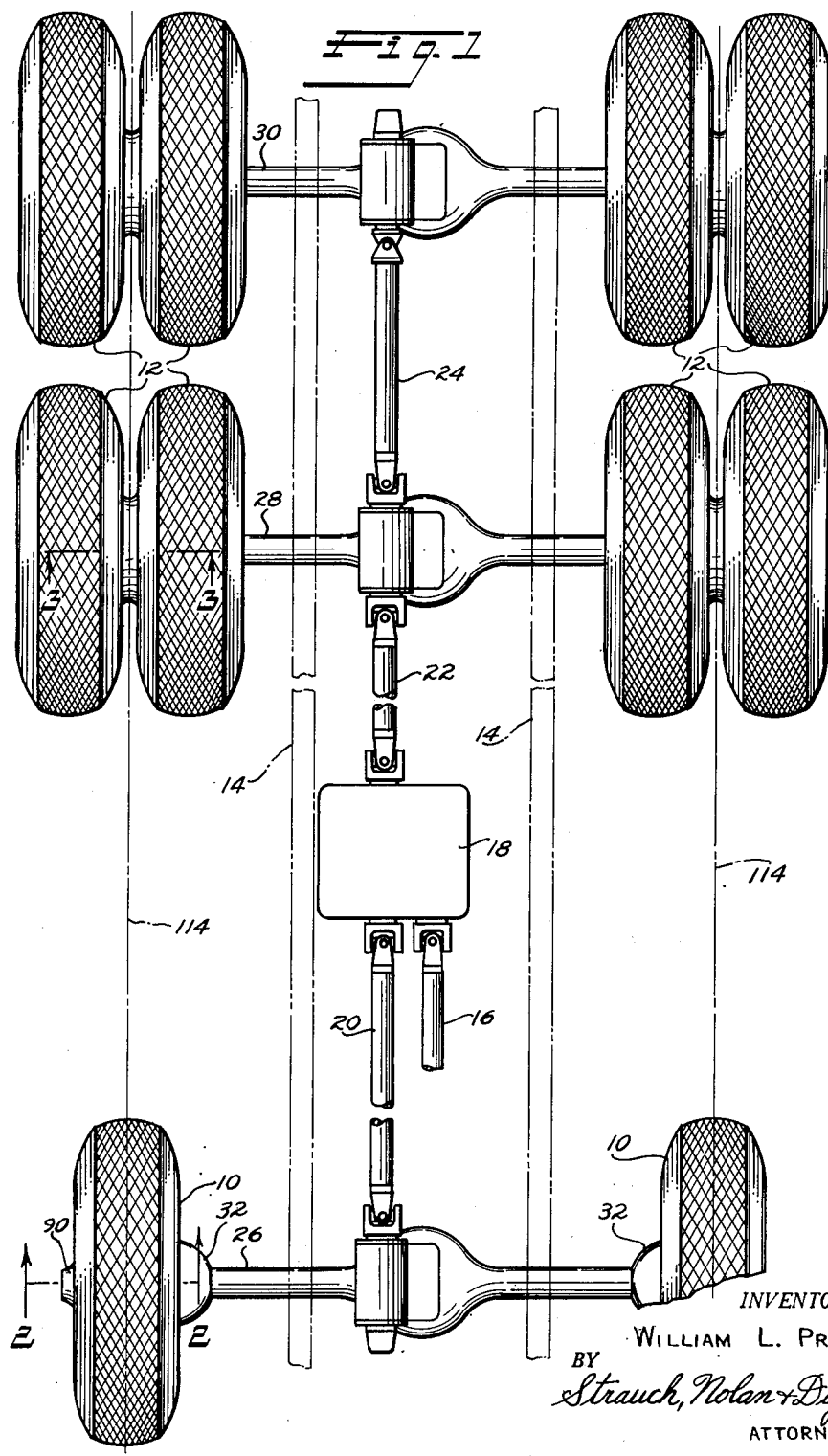

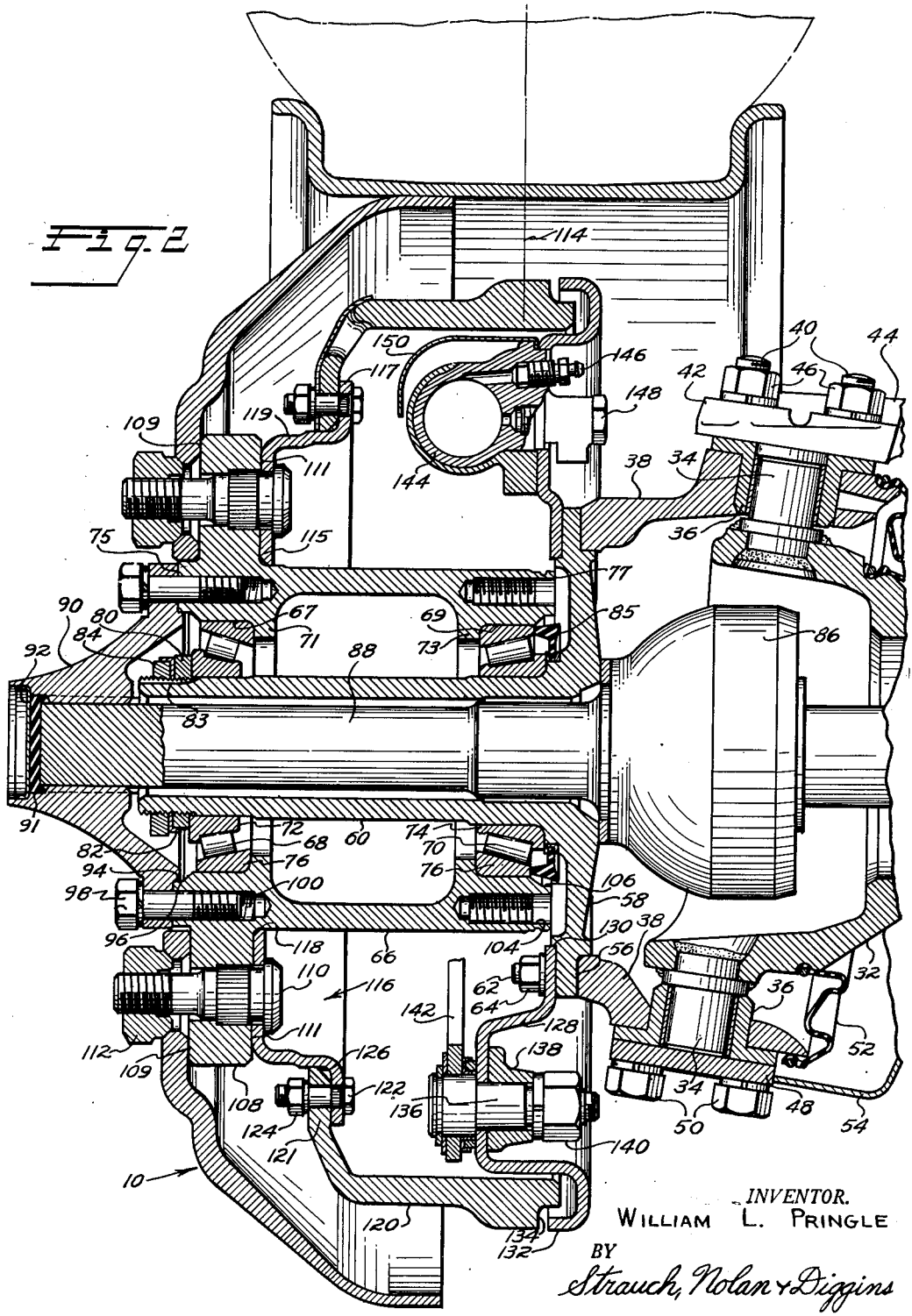

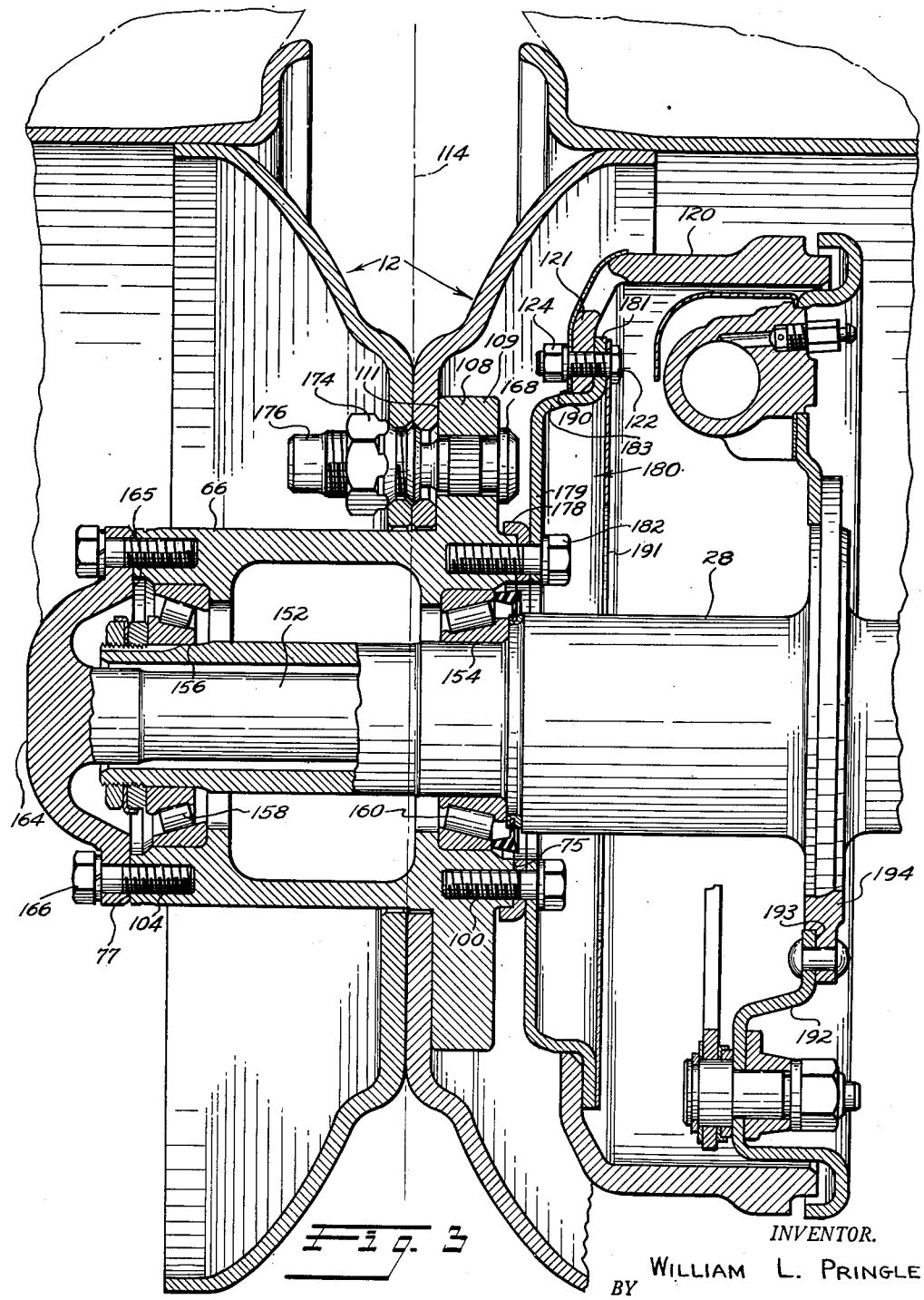

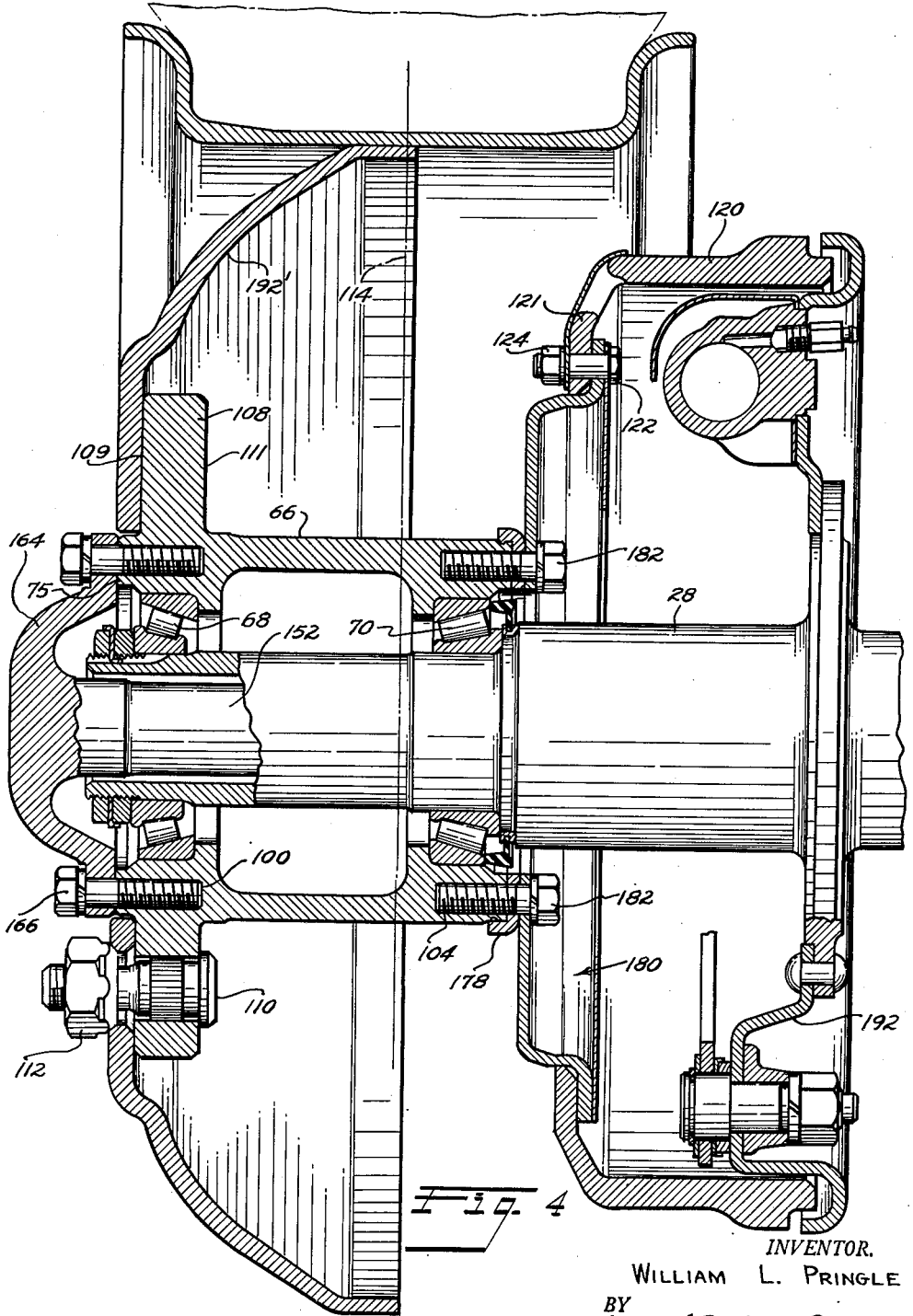

2,599,013

UNITED STATES PATENT OFFICE 2,599,013

HUB AND BRAKE ASSEMBLY

William L. Pringle, Detroit, Mich., assignor to The Timken-Detroit Axle Company, Detroit, Mich., a corporation of Ohio Application December 15, 1950, Serial No. 200,970

2 Claims. (Cl. 301—6)

This invention relates to wheeled vehicles and more particularly to wheel hub and brake assemblies for such vehicles. The invention is particularly suited for use in vehicles having two or more driving axles although it is not limited thereto.

Wheel hubs and brake assemblies heretofore proposed for use with vehicles having a front drive axle or dual rear wheels have usually been so designed as to limit their use to either front or rear axles and ordinarily to either the inner or outer position in the case of dual wheels.

The differences in design of the wheels and brake assemblies formerly thought to be necessary because of the different mounting parts incorporated in the several wheel positions have materially increased the cost of equipping vehicles with wheels and brakes. This lack of interchangeability of wheel assemblies has forced service organizations to maintain inventories of three or four different wheel assemblies for each type of vehicle. In many instances vehicles have been kept out of service because of a shortage of one type of wheel assembly despite the availability of other types. Such a situation is particularly undesirable in military operations where inventories are necessarily limited and the need for maintaining vehicles in continuous service is especially important.

I have found that, by providing a reversible wheel hub of simple rugged construction and simple removable interchangeable brake drum adapters, it is possible to provide standardized wheel hub and brake assemblies for either front or rear drive axles using either single or dual wheels, without the need of extra parts and with a minimum of inventory.

This construction eliminates the need for the manufacture and stocking of several different wheel assemblies, thus substantially reducing the cost of manufacture, replacement, and service and materially increasing the efficiency of service organizations which may provide wheel assemblies for all positions on the vehicle while maintaining substantially reduced inventories. Because of the simplicity of the brake drum adapters made according to the present invention, they may be manufactured at very low cost and thus may be made available in adequate supply in service organizations which heretofore have been unable to stock sufficient supplies of the relatively expensive wheel assemblies.

Accordingly, it is a major object of the invention to provide novel wheel hub and brake assemblies which with rearrangement of their component parts may be interchangeably installed at all positions in all types of vehicles regardless of the number and arrangement of the driving wheels.

Another object of the invention is to provide novel wheel hub and brake assemblies which may be used with either single or dual wheels while maintaining substantially the same wheel track width.

It is a further object of the invention to provide a novel brake drum, adapter and wheel hub assembly.

A further object of the invention is to provide a novel reversible wheel hub structure.

It is also an object of the invention to provide a brake drum mounted axially inwardly of a wheel mounting flange on a wheel hub and adapted to be removed from the assembly without removal of the wheel hub.

It is a more specific object of the invention to provide an axle assembly including a wheel hub having a wheel mounting flange, a brake drum mounting adapter secured to the flange, and a brake drum piloted on the adapter, the pilot diameter of the adapter being greater than the maximum diameter of the wheel mounting flange.

Other objects and advantages of the invention will become apparent as the description proceeds in connection with the accompanying drawings in which:

Figure 1 is a diagrammatic plan view of the power transmission system and ground engaging wheels of a vehicle according to a preferred embodiment of the present invention;

Figure 2 is an enlarged fragmentary sectional view taken along line 2—2 of Figure 1 illustrating the invention as applied to a front driving axle;

Figure 3 is a similar view taken along line 3—3 of Figure 1 illustrating a dual wheel rear driving assembly incorporating the present invention; and Figure 4 is an enlarged fragmentary sectional view illustrating the invention as utilized on a single rear driving wheel assembly.

By way of example, the invention will be described in connection with a six wheel drive vehicle, although it will be understood that the invention has equal application to vehicles having a smaller or greater number of driving axles and wheels.

Referring now particularly to Figure 1, a pair of front driving wheels 10 and eight rear driving wheels 12 are attached to longitudinal chassis frame members 14 in conventional manner.

Driving power is supplied to the wheels from a suitable engine (not shown) through shaft 16, transfer case 18, propeller shafts 20, 22 and 24, and axles which are contained in housings 26, 28, and 30, all of which driving components are operatively connected in accordance with conventional practice.

Referring now to Figure 2, in which the details of the outer section of the front driving axle and wheel and brake assembly are shown on an enlarged scale, 32 indicates a substantially semispherical auxiliary housing which may form an integral extension of axle housing 26 or may be bolted thereto by any suitable means (not shown). Trunnion pins 34 are welded in place in axially aligned bores in housing 32 and project therefrom into bores in caps 36 with a tight rotating fit. Caps 36 are received in axially aligned upper and lower bores in a hollow auxiliary housing 38. The upper cap 36 is secured to housing 38 by studs 40 which project upwardly through cap 36 and through a cover plate 42 which carries a steering link 44. Nuts 46 are provided on studs 40 to secure the components in assembled relation.

The lower cap 36 is provided with a cover plate 48, the cap and the plate being secured to housing 38 as by cap screws 50. In accordance with conventional practice, the mounting surfaces on the lower trunnion pin and cap are accurately machined to provide a suitable thrust bearing surface therebetween.

The space between the housings 32 and 38 is sealed by a boot 52 secured in grooves in the respective housings by lock wires as more fully described in United States Patent 2,362,456. The boot is protected by a member 54 secured by any suitable means, not shown, to the trunnion assembly.

Secured by studs 62 and nuts 64 to a bolting face 56 on housing 38, which is preferably so inclined with respect to the trunnion axis as to impart a predetermined degree of camber to the spindle, is a flange 58 of a tubular spindle 60.

An interchangeable reversible wheel hub 66 of the invention is here journalled on a pair of spaced anti-friction roller bearings 68 and 70 having their outer races pressed tightly into cylindrical internal hub seats 67 and 69. The inner race 72 of bearing 68 is considerably thicker than the inner race 74 of bearing 70 to compensate for the difference in diameters between the corresponding portions of the spindle. This construction makes it possible to utilize the same outer race 76 in each of the bearings, thus allowing seats 67 and 69 on the hub 66 to be of the same size and shape. Seats 67 and 69 are also preferably spaced the same distance from the ends of the hub so as to render the hub reversible as for interchangeable installation on the rear axle, as will appear. As illustrated in Figure 2, internal hub flanges 71 and 73 are spaced equidistantly from flat parallel faces 75 and 77 at opposite ends of the hub 66. Flanges 71 and 73 provide stop shoulders for properly locating the outer races of the bearings. Hub end faces 75 and 77 are perpendicular to the axis of rotation of the hub.

The inner bearing race 72 at the outer end of spindle 60 is contracted by adjustable nut 80. A locking member 82 extends into a keyway 83 in spindle 60, and a locknut 84 is threaded onto the outer end of spindle 60 to hold the adjustment. An annular sealing member 85 of Neoprene or the like is positioned in a groove in the spindle and extends outwardly across bearing 70 to seal the bearing from dust and dirt and other extraneous matter.

The hub 66 is driven from the axle shaft by means of a universal joint 86 of conventional design located in the ball portion of housing 32 and a stub shaft 88 upon which is splined a cap 90. A deformable seal 91 is held against the end of shaft 88 by a cover plate 92 pressed into a central opening in cap 90 to seal the splines and outer bearing 68. Cap 90 is provided with a piloting flange 94 which snugly fits a cylindrical piloting surface 96 within the hub, and cap 90 is rigidly secured to the hub as by a plurality of bolts 98 threaded into tapped holes 100.

A plurality of tapped holes 104 exactly matching holes 100 and disposed at the same distance from the hub axis are provided in the opposite end of the hub. Also, an internal pilot surface 106 identical with pilot surface 96 is provided in the inner end of the hub 66 to make the hub fully reversible and interchangeable as will appear.

Hub 66 is also provided with an annular external bolting flange 108 having flat machine annular surfaces 109 and 111 on its opposite sides. Flange 108 is located adjacent one end of the hub surrounding bearing seat 67 for the purpose of adapting it for either front or rear axle installations or dual or single wheel installation as will appear more fully hereinafter.

A front wheel 10 is secured to the hub by a plurality of circumferentially spaced studs 110 extending through flange 108 to receive nuts 112, with the longitudinal vertical centerline of the wheel lying on load line 114. With reference to the single wheel assemblies of Figures 2 and 4 and the dual wheel assembly of Figure 3, the load line 114 lies in a medial plane substantially normal to the axis of rotation of the associated wheel assembly and represents the theoretical line of concentration of the load carried by the wheel assembly. When nuts 112 are drawn tight, the wheel is flush with flange surface 109 thus properly locating it in the assembly. Secured to the inner side of flange 108 by studs 110 is an annular brake drum adapter member 116 accurately positioned on hub 66 by means of a cylindrical pilot surface 118. Adapter member 116 comprises spaced parallel radial portions 115 and 117 connected by an axially extending intermediate portion 119. A brake drum 120 has an end flange 121 secured to the outer radial portion 117 of the adapter by circumferentially spaced bolts 122 and nuts 124. The outer surface 126 of intermediate adapter portion 119 and the radially outer portion 117 of the adapter locate the brake drum 120 with respect to the wheel hub. It is to be noted that the diameter of surface 126 is greater than the outer diameter of hub flange 108 to allow removal of drum 120 without removal of the wheel hub.

A brake foundation plate 128 is secured directly to flange 58 of spindle 60 as by studs 62 and nuts 64. Piloting surfaces 130 are provided on the flange 58 to accurately position the plate 128 with respect to the other components of the wheel and brake assembly. The foundation plate 128 is provided with a peripheral flange 132 fitting loosely into a recess 134 in the inner edge of the brake drum for excluding extraneous material in a well known manner. The brake mechanism, which may be of any conventional design, comprises an anchor pin 136 secured in a boss 138 on the foundation plate and locked against rotation by a nut 140. A brake shoe actuating member 142 is mounted on pin 136 and is actuated by a fluid cylinder 144 mounted on foundation plate 128 in a position diametrically opposed to pin 136. The cylinder 144 is provided with fluid connections 146 and 148 and a heat resisting shield member 150 in conventional manner.

Referring now to Figure 3, which illustrates the novel hub and brake assembly utilized on a dual wheel rear drive assembly, 152 indicates a driven rear axle shaft which is positioned within axle housing 28.

Housing 28 is provided with seating surfaces 154 and 156 which are of the same diameter and have the same longitudinal spacing as the bearing seating surfaces provided on spindle 60 so that the hub may be journalled thereon in bearings 158 and 160 which are identical to bearings 68 and 70. Hub 66 is reversed end for end from the position shown in Figure 2 so as to dispose wheel mounting flange 108 inwardly of the longitudinal vertical plane containing load line 114. The outer bearing clamping members and the inner bearing sealing member are identical to the elements 80, 82, 84, and 85 described above.

Hub 66 is drivingly connected to axle shaft 152 through an integral axle shaft flange which is secured to the hub by cap screws 166. A flat surface 165 on the axle shaft flange is drawn tight against the flat hub end surface 77 when the cap screws are tightened. Because of the inversion of the hub, screws 166 are threaded into tapped holes 104. Inner and outer wheels 12 are drawn tight against flange side surface 111 as by centering nuts 174 and studs 176.

It will be seen from Figure 3 that, in the reversed position of the hub, the wheel mounting surface 111 of the flange 108 is located to dispose the longitudinal vertical central plane of the dual wheel assembly exactly in the plane of load line 114 which extends through the centerline of the front wheel, thus assuring proper tracking of the front and rear wheels.

To the inner side of the hub 66, a spacer ring 178 and a brake drum adapter member 180 are secured by bolts 182 which are threaded into the tapped holes 100. Adapter member 180 is generally of the same configuration as adapter member 116 and comprises two radial portions 179 and 181 connected by an intermediate portion 183, but its proportions are different.

Flange 121 of brake drum 120 is secured to the outer radial portion 181 of adapter 180 as by bolts 122 and nuts 124 which also secure a dust plate 191 to the inner side of the adapter. The adapter 180 is provided with a piloting surface 190 which engages the inner periphery of the drum flange 121 to assure accurate centering of the drum with respect to the hub 66. It is to be noted that, as in the construction of Figure 2, the piloting surface 190 is radially spaced from the center of the hub at a greater distance than the outer end of the wheel mounting flange 108 to permit removal of the brake drum without necessitating removal of the wheel hub.

A brake foundation plate 192, which is preferably identical to plate 128, is secured in a machined annular recess 193 in a flange 194 extending outwardly from axle housing 28 and carries a brake shoe and brake actuating assembly identical to that previously described in connection with Figure 2.

Figure 4 illustrates the novel hub and brake assembly as installed in a rear single wheel drive assembly. The correspondingly numbered parts are the same as in Figure 2. Hub 66 is, however, in a position reversed end to end with respect to that of Figure 3, with the wheel mounting flange 108 disposed axially outwardly of the wheel centerline.

The axle shaft flange 164 is here drivingly secured to the hub 66 by cap screws 166 which are received in tapped holes 100 in hub 66. A wheel assembly 192' is secured upon the outer side surface 109 of flange 108 by a plurality of studs 110 and tapered nuts 112 in the manner described in connection with Figure 2. It will be seen that the centerline of the wheel 192' coincides with load line 114 to assure proper tracking of the front and rear wheels.

The spacer 178, adapter 180, brake drum 120, foundation plate 192 and the brake assembly are in the same assembly as in Figure 3. However, because of the inversion of the hub, the bolts 182 securing the spacer 178 and adapter 180 to the hub are received in openings 104 rather than openings 100.

From the foregoing it will be apparent that there is provided a thoroughly practical, inexpensive, rugged wheel hub and brake assembly which with the addition of one of two available simple adapters, may be interchangeably used at all positions in a vehicle regardless of the number of drive axle or the number of wheels installed on each axle.

Further, this interchangeability is effected while permitting increased operating and servicing efficiency. The novel design of the hub and brake assembly assures proper tracking of the front and rear wheels and maintains substantially the same wheel width whether or not dual rear wheels are used. In the case of rear dual rear wheels, the centerline of the rear wheels is maintained in alignment with centerline of the front wheel assembly, while in the case of single rear wheels the centerline of the front and rear wheels are maintained in substantially exact alignment.

The novel hub and brake assembly also facilitates inspection, repair, and replacement of the brake drum and other components of the brake assembly by permitting the removal of the drum, which is located inwardly of the wheel mounting flange, without necessitating removal of the wheel hub.

Installation and replacement cost are further reduced by virtue of the fact that the novel brake adapter permits the use of the same brake assembly in both the front and rear axles whether the hub is installed with the wheel mounting flange disposed outwardly, as in the front wheels and in the rear single wheels, or reversed for rear dual wheel installation. In each case the adapters locate the brake drums in proper operating relation with the brake shoes and the actuating assembly.

The invention may be embodied in other specific forms without departing from the spirit or assential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle wheel structure wherein the same hub and the same brake drum may be incorporated in axles having either dual wheel or single wheel assemblies, a spindle, a hub, means for mounting said hub rotatably on said spindle in either of two end-for-end reversed positions, an external radial wheel attachment flange on said hub, a brake drum having both end openings larger than said wheel attachment flange and a mounting flange surrounding one of said openings, bolting faces on opposite ends of said hub and on said wheel attachment flange, all of said bolting faces being normal to the axis of rotation of the hub, an annular adapter member secured at its inner periphery to one of said bolting faces, and a flange on the outer periphery of said adapter member secured to the inner side of said drum mounting flange in either position of said hub, whereby upon removal of the wheel assembly from said attachment flange the brake drum may be detached from said adapter member and moved outwardly over said wheel attachment flange without removing the hub.

2. A vehicle wheel structure wherein the same hub and the same brake drum may be incorporated in axles having either dual wheel or single wheel assemblies comprising a wheel assembly, a spindle, a hub, axially spaced bearings having outer races of substantially the same diameter for mounting said hub rotatably on said spindle in either of two end-for-end reversed positions, an external radial wheel attachment flange on said hub disposed nearer one end of the hub than the other and means mounting said wheel assembly on said flange locating the load line through either single or dual wheel assemblies to pass radially through said hub in either position and thereby avoid objectionable differences in bearing load in the reversed positions of said hub, a brake drum, bolting faces on opposite ends of said hub and on said wheel attachment flange, all of said bolting faces being normal to the axis of rotation of the hub, and an annular adapter member which in either position of the hub is secured at its inner periphery to one of said bolting faces and at its outer periphery to said drum.

WILLIAM L. PRINGLE.

REFERENCES CITED

The following references are of record in the file of this patent:

UNITED STATES PATENTS

| Number | Name | Date |
|---|---|---|
| 1,415,356 | Jandasek | May 9, 1922 |
| 1,606,077 | Johnson | Nov. 9, 1926 |
| 1,937,839 | Parrett | Dec. 5, 1933 |
| 1,985,351 | Miller | Dec. 25, 1934 |
| 2,052,277 | Burnett | Aug. 25, 1936 |
| 2,075,563 | Alden | Mar. 30, 1937 |
| 2,087,684 | Alessi-Grimaldi | July 20, 1937 |
| 2,139,937 | Collender | Dec. 13, 1938 |
| 2,232,584 | Aitken | Feb. 18, 1941 |
| 2,303,599 | Ash | Dec. 1, 1942 |
| 2,311,528 | Freer | Feb. 16, 1943 |
| 2,392,832 | Buckendale | Jan. 15, 1946 |
| 2,507,134 | Ash | May 9, 1950 |
| 2,548,107 | Horn | Apr. 10, 1951 |